United States Patent [19]
Good

[11] Patent Number: 5,316,096
[45] Date of Patent: May 31, 1994

[54] PORTABLE MOTORIZED SUITCASE

[75] Inventor: Sidney R. Good, Cleveland, Ohio

[73] Assignee: Good Marketing, Inc., Cleveland, Ohio

[21] Appl. No.: 918,274

[22] Filed: Jul. 22, 1992

[51] Int. Cl.$^5$ .............................................. B62D 51/04
[52] U.S. Cl. .................................. 180/19.1; 180/216; 280/37
[58] Field of Search ...................... 180/208, 216, 19.1, 180/19.3, 65.1; 280/37; 190/115

[56] References Cited

U.S. PATENT DOCUMENTS

| | | |
|---|---|---|
| 1,616,632 | 2/1927 | Mastrontonio ...................... 190/115 |
| 2,670,052 | 2/1954 | Craver ................................. 180/19.1 |
| 3,314,494 | 4/1967 | Weitzner . |
| 3,316,993 | 5/1967 | Weitzner . |
| 3,370,664 | 2/1968 | Caplan . |
| 3,446,304 | 5/1969 | Alimanestiano ...................... 280/37 |
| 3,759,339 | 9/1973 | Farrow ................................. 180/216 |
| 3,815,699 | 6/1974 | Ganskopp et al. ................. 180/19.1 |
| 3,820,617 | 6/1974 | Groff ................................... 180/19.1 |
| 4,094,374 | 6/1978 | Adams . |
| 4,113,042 | 9/1978 | Vaill . |
| 4,399,883 | 8/1983 | Todokoro ........................... 180/216 |
| 4,610,333 | 9/1986 | Seynhaeve . |
| 4,838,396 | 6/1989 | Krenzel ............................... 190/115 |
| 4,913,252 | 4/1990 | Bartley et al. . |
| 4,915,402 | 4/1990 | Brinker . |
| 4,928,800 | 5/1990 | Green et al. . |
| 5,048,649 | 9/1991 | Carpenter et al. . |
| 5,097,922 | 3/1992 | Stagi et al. . |

Primary Examiner—Karin L. Tyson
Attorney, Agent, or Firm—Pearne, Gordon, McCoy & Granger

[57] ABSTRACT

The present invention pertains to a portable motorized suitcase which can operate in either self-propelled or manual modes. The suitcase includes an extendable handle which is provided with a multi-position switch, allowing the user to selectively control the speed of the suitcase when in the self-propelled mode, as well as allowing the user to choose between modes of operation. A motor, which is controlled by the multi-position switch located on an extendable handle, conveys power to the ground engaging wheel via a centrifugal clutch arrangement. The clutch allows the motor to propel the suitcase when it is in the self-propelling mode while not hindering the rolling of the wheels when the motor is in the manual mode. Therefore, the motor and clutch arrangement either turns the wheels or allows them to free-wheel, depending upon the operator's positioning of the multi-position switch. Transition between modes of operation occurs automatically in accordance with user manipulation of the switch. The motor is supplied with power from a removable battery pack. The rear wheels of the suitcase, one of which is selectively driven by the motor, are outwardly spaced from the sidewalls of the suitcase to stably support the suitcase during movement thereof.

8 Claims, 2 Drawing Sheets

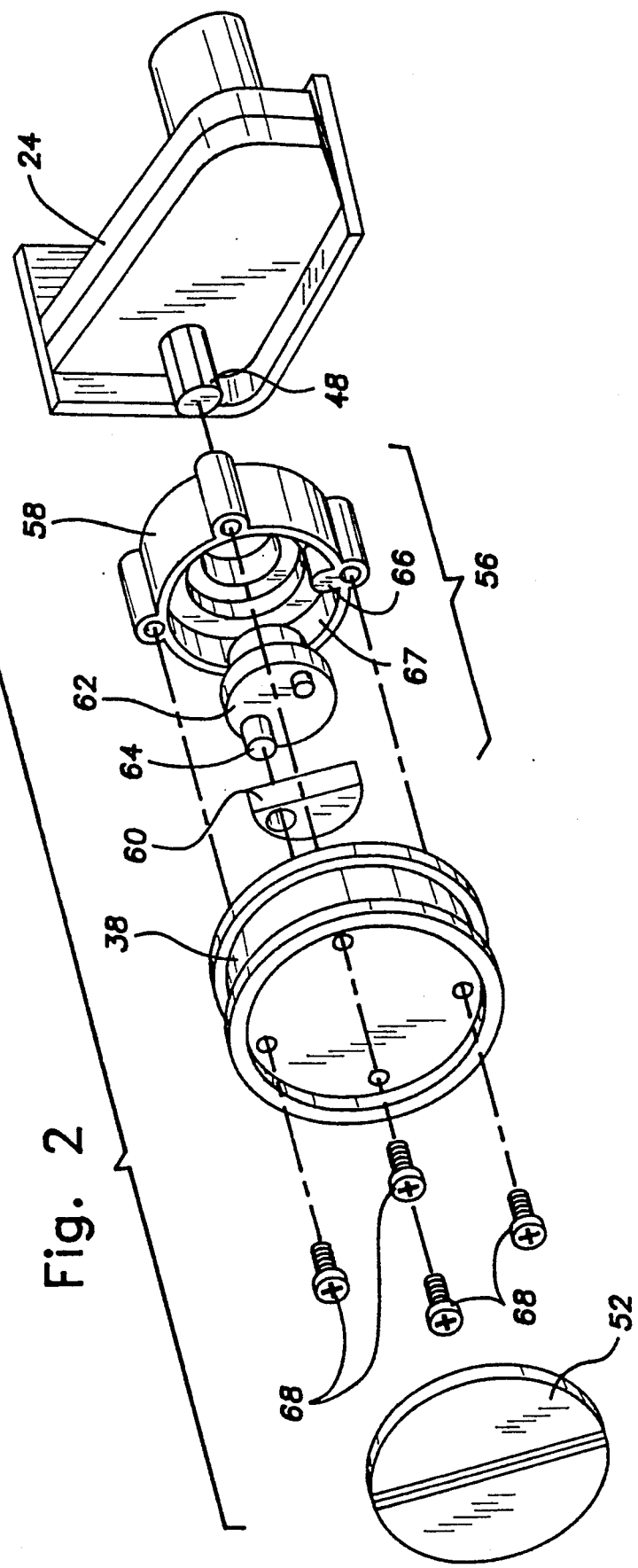

PORTABLE MOTORIZED SUITCASE

BACKGROUND OF THE INVENTION

1. Field of the Invention

The present invention relates generally to suitcases and, in particular, to motorized suitcases.

2. Description of the Related Art

During the development of suitcases, it has become popular to provide wheels to aid the user in transporting the suitcase. Several types of wheeled suitcases are known in the art, as evidenced by U.S. Pat. Nos. 5,048,649 and 4,928,800. In suitcases of this type, the wheels are generally provided directly underneath the suitcase or in line with the sidewalls thereof. However, locating the wheels in these common positions does not provide a stable base, especially when turning or otherwise manoeuvering the suitcase.

As suitcases have further developed, the general idea of having the suitcase include means to provide a self-propelling function has been proposed. Generally, suitcases developed along these lines have also often included a user-carrying or transporting feature. U.S. Pat. No. 4,913,252 is illustrative of motorized suitcases of this type.

The '252 patent discloses a suitcase which includes an internal battery and a wheel-driving motor. The motor, which is operated when a switch-actuating handle is lifted, transfers rotational motion to a ground engaging wheel via a bevel gear. The suitcase also provides an operator transporting feature whereby the operator can stand upon a platform located in front of the suitcase and be propelled thereby. It is not possible with the motorized suitcase of the '252 patent to select different speeds of operation. Also, it is not possible for the operator to manually pull the suitcase without experiencing resistance from the motor via the bevel gear.

Therefore, there exists a need in the art for a multi-speed motorized suitcase which allows the user to select between speeds of operation of the motor as well as to manually pull the suitcase without encountering resistance from the motor. There also exists a need in the art for a wheeled suitcase which provides the wheels at a location better able to stably support the suitcase as it moves along.

SUMMARY OF THE INVENTION

In accordance with the present invention, there is provided a portable motorized suitcase which can be operated at multiple speeds. Also, the suitcase of the present invention provides wheels which are spaced outwardly from the main sidewalls of the suitcase to provide better stability.

In further accordance with the present invention, the motorized suitcase provides an extendable handle to facilitate pulling and guiding of the suitcase. The handle is slidably and pivotally received by a slot provided in the end of the suitcase and includes control means on an end thereof to allow the user to select the operational speed of the motor and, hence, the speed at which the suitcase is propelled.

In further accordance with the present invention, a removable battery pack is received by the suitcase. The battery pack is electrically connected to the control means, and supplies a predetermined level of energy to the motor corresponding to the selection of the operator. The battery pack is snap fit into the outer shell of the suitcase to allow for easy and convenient installation and removal.

A clutch means is provided intermediate the motor and a ground engaging wheel. The clutch transfers rotary motion from a motor drive shaft to the driven ground-engaging wheel. The clutch is designed to allow the driven ground-engaging wheel to "free wheel" when the motor is not engaged. That is, the ground engaging wheel freely rotates when the motor is not operating, allowing the operator to manually pull the suitcase without experiencing additional resistance from the motor.

The suitcase produced in accordance with the present invention is operable in either a manual or a self-propelled mode. When in the self-propelled mode, the suitcase is capable of operation at multiple speeds to accommodate the characteristic walking speeds of various users. When in the manual mode, the suitcase pulls easily, without the added resistance of the motor, which is a drawback in motorized suitcases known in the art. In either mode, the suitcase provides a wide wheel base to stably support the suitcase during movement thereof.

BRIEF DESCRIPTION OF THE DRAWINGS

The present invention will be more fully described hereafter, with reference to the drawing figures, wherein.

DETAILED DESCRIPTION OF THE PREFERRED EMBODIMENT

Figure 1:
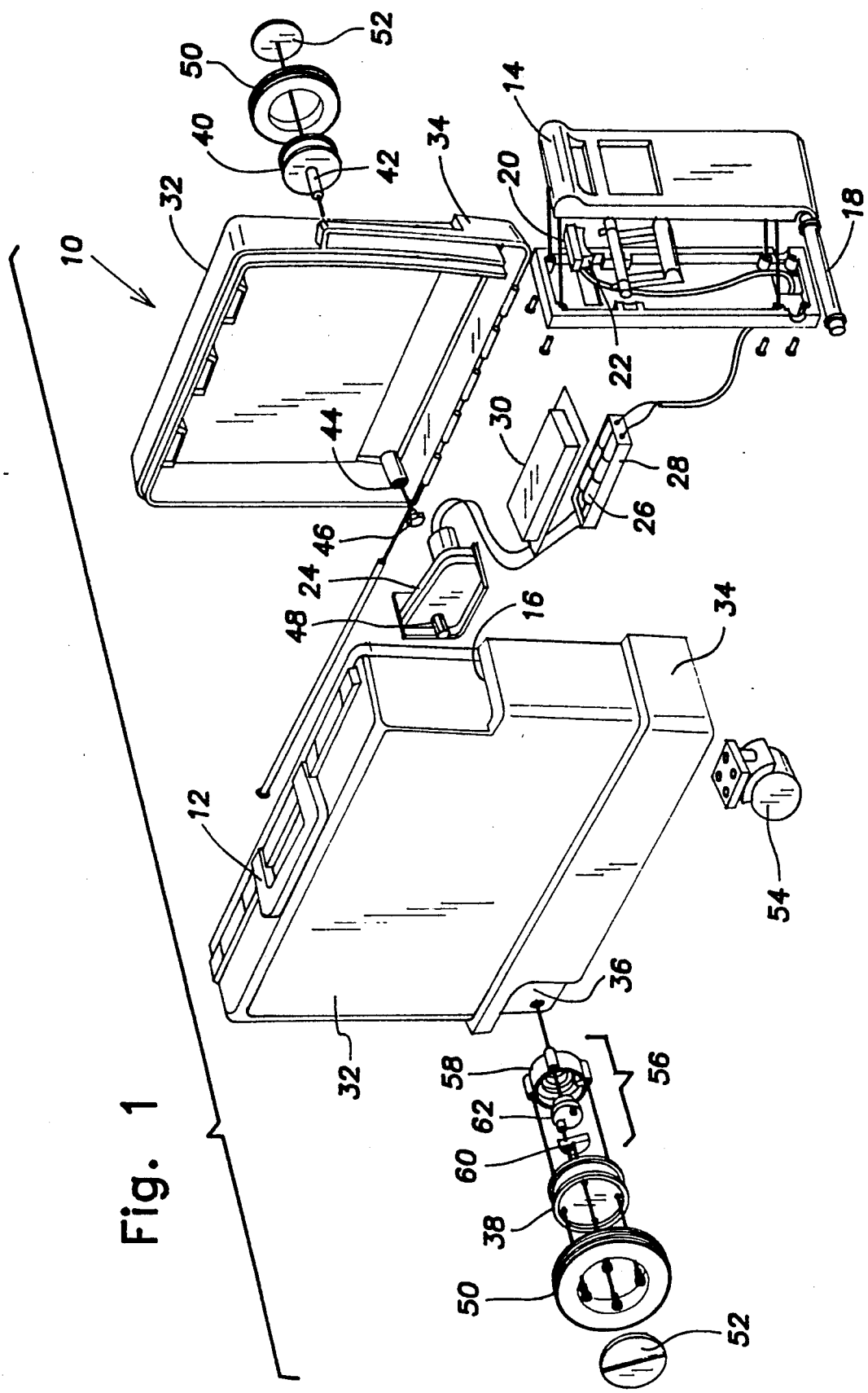
FIG. 1 is an exploded perspective view of the motorized suitcase in accordance with the present invention; and, FIG. 2 is a perspective view of the clutch and motor of the present invention.

With reference to the drawing figures, a portable motorized suitcase 10 produced in accordance with the present invention is shown. As illustrated, the suitcase 10 includes a conventional top handle 12 to facilitate lifting and a forwardly mounted extendable handle 14 to aid in pulling and/or guiding the suitcase. The forwardly mounted extendable handle 14 is received by an upwardly-opening slot 16 provided by an end of the suitcase 10.

The extendable handle 14 is deployed by vertically pulling or sliding the handle out of the slot 16, and thereafter pivoting the handle about a pivoting rod 18 provided on an end thereof, the pivoting rod 18 being received by a pair of notches (not shown) adjacent the upper end of the slot 16. As so deployed or positioned, the extendable handle 14 is located for convenient access by the user to allow easy pulling and/or guiding of the suitcase 10 depending upon the mode of operation, as will be apparent from the description which follows.

The extendable handle has mounted thereto control means 20 which are manipulated by the operator to control the operation of a motor 24 which, in turn, controls the speed at which the suitcase 10 is propelled. In the preferred embodiment, the control means 20 includes a three position switch 22, one position of which corresponds to having the motor 24 in an inoperable or "off" state, while the other two positions correspond to first and second operational speeds of the motor 24. Naturally, any number of speeds may be selected or provided for without departing from the scope of the present invention, the provision of two speeds being specifically disclosed since it is the preferred embodiment of the present invention currently contemplated by the inventor.

A removable battery pack 26 is provided by the suitcase along the bottom thereof. The battery pack 26 is electrically connected to the control means 20 and the motor 24, supplying different levels of electrical energy to the latter in response to user manipulation of the former. The battery pack 26 is snap-fit into a battery pack housing 28 located in the bottom of the suitcase 10, allowing easy access for recharging, removal, replacement and in the event that it is required by airport security. A battery pack cover 30 separates the battery pack 26 and housing 28 from the interior of the suitcase 10. A snap fit cover (not shown) is provided to close the battery receiving aperture (not shown) provided by the bottom of the suitcase.

As illustrated in FIG. 1, the suitcase 10 has a generally box-like outer shell, including hingedly attached mating halves 32 which define the interior storage space, as is conventional in the art. The suitcase also provides an outwardly stepped portion 34 at its lower extremity. The outwardly stepped portion 34 provides notched recesses 36 at the bottom rear corners thereof to receive first and second rear wheels 38, 40, as illustrated.

The second rear wheel 40 is rotatably mounted onto a shaft 42 which is received by a bore 44 provided by the shell of the suitcase 10. A push nut 46 mounted on the end of the shaft 42 retains the shaft within the bore 44.

The first rear wheel 38, also called the driven wheel, is clutchingly mounted to a drive shaft 48 of the motor 24, as will be described more fully hereafter with reference to a clutch means 56 of the present invention. Each of the rear wheels 38, 40 is provided with a rubber tire 50 or the like to improve traction and operation thereof and a wheel cover 52 to cover a circular recess formed within the face of each of the rear wheels. As illustrated, a single front wheel or caster 54 is provided to aid in supporting and steering the suitcase 10.

The motor 24 is mounted at the bottom of the interior of the suitcase 10 intermediate the first and second rear wheels 38, 40. The motor 24 is electrically connected to the removable battery pack 26, the amount of energy the motor receives from the battery pack being determined by user manipulation of the switch 22 provided by the control means 20. The motor drive shaft 48 extends from the motor outwardly through the suitcase shell adjacent one of the notched regions 36 provided by the outwardly stepped portion 34.

The clutch means 56, which is provided intermediate the motor 24 and the driven wheel 38 on the exterior of the suitcase 10 at one of the notched recesses 36, includes a clutch housing 58, a clutch brake 60, and a clutch drive wheel 62. The clutch drive wheel 62, which is rotatably mounted to the drive shaft 48 of the motor 24, provides an outwardly extending pin 64 on which is pivotally mounted the clutch brake 60. The clutch housing 58 provides a projection or rib 66 which extends radially inward from an inner wall 67 thereof and is designed to engage the clutch brake 60 during operation, as will be described more fully hereafter. As illustrated best in FIG. 2, the driven wheel 38 is attached to the clutch housing 58 by means of a series of conventional fasteners 68, and the clutch drive wheel 62 and clutch brake 60 are located between the driven wheel 38 and the clutch housing 58.

Operation of the suitcase 10 in both the self-propelled and manual modes will be described hereafter with reference to the foregoing description and drawings. Transition between modes of operation occurs automatically in accordance with user manipulation of the control means 20, as will be apparent from the following discussion.

When the motor 24 is in operation, the motor drive shaft 48 rotates and the clutch brake 60 is forced, due to centrifugal force, to pivot about the outwardly extending pin 64 provided by the clutch drive wheel 62. As the clutch brake 60 pivots, a portion thereof moves radially outward, toward the inner wall 67 of the clutch housing 58, and engages the inwardly projecting rib 66 provided thereby. When the clutch brake 60 engages the rib 66 provided by the clutch housing 58, it wedges itself in place and causes the clutch housing to be mechanically interlocked with the clutch brake and clutch drive wheel 62, thus forcing the clutch housing to rotate with the clutch drive wheel. The clutch housing 58, in turn, causes the driven wheel 38, which is fastened thereto, to rotate. Therefore, the driven wheel 38 rotates at the same speed as the motor drive shaft 48, the drive shaft speed being selected by user manipulation of the control means 20 provided on the extendable handle 14.

During the self-propelled mode of operation, the extendable handle 14 generally performs a guiding function, the handle together with the front wheel or caster 54 allowing the user to steer the suitcase 10 along the intended path. The control means 20 allows the user to choose a motor speed of operation which results in a comfortable walking speed for the user.

When the three-position switch 22 of the control means 20 is switched to the "off" position, the transition from the self-propelled to the manual modes occurs. As the motor 24 ceases to operate, the rotational speed of the motor drive shaft 48 slows, and is no longer as fast as the rotational speed of the driven wheel 38 and the clutch housing 58. This results in slowing of the clutch drive wheel 62 and disengagement of the clutch brake 60 from the rib 66 on the inside of the clutch housing 58. Thereafter, the clutch drive wheel 62 is no longer mechanically interlocked with the clutch housing 58 via the clutch brake 60, and the driven wheel 38 is thereby allowed to freely turn, without the added resistance of the motor 24 being felt by the person pulling the suitcase.

Therefore, the powered suitcase 10 of the present invention converts from self-propelled to manual operation merely by switching the three-position switch 22 to the "off" position. Conversion back to the self-propelled mode occurs by moving the switch 22 to one of the two operational speeds of the motor 24, as should be clear from the foregoing discussion. Naturally, during operation in the manual mode, the extendable handle 14 allows the user to both pull and guide the suitcase along the intended path.

The foregoing description of the invention is merely intended to be illustrative of the preferred embodiment of the invention currently contemplated by the inventor, and is not to be construed in a limitative manner. Moreover, it is clear that there are several equivalent structures known in the art which could replace the ones specifically described in the foregoing specification without departing from the scope and spirit of the invention as defined and embodied in the claims appended hereto. For example, in the described embodiment a centrifugal clutch is employed to selectively couple the drive shaft to the driven wheel. It is clear that there are alternative clutch structures, as well as other well known mechanisms, which could be used to selectively couple the drive shaft and the driven wheel without departing from the scope of the claims appended hereto.

What is claimed is:

1. A portable suitcase for transporting articles, comprising:
    a motor means which includes a drive shaft, said drive shaft being coupled to a centrifugal clutch associated with a driven wheel, said centrifugal clutch mechanically coupling said driven wheel to said drive shaft when said motor is in a first mode of operation and uncoupling said driven wheel from said drive shaft when the motor is in a second mode of operation, said centrifugal clutch including a clutch housing fastened to said driven wheel, a clutch drive wheel mounted on said drive shaft, and a clutch brake, said clutch brake being pivotally mounted on said clutch drive wheel whereby rotation of said drive shaft and said clutch drive wheel causes the clutch brake to pivot and engage said clutch housing, engagement of said clutch brake and the clutch housing mechanically interlocking said clutch housing and said clutch drive wheel and causing said clutch housing and said driven wheel to rotate with said clutch drive wheel and said drive shaft;
    a battery means to power said motor, said battery means supplying electrical energy to the motor to drive said wheels in response to user manipulation of a control means; and
    a handle means, said handle means being slidably and pivotally mounted on said suitcase whereby said handle can move from a retracted, undeployed position to an extended, deployed position, said handle means further including said control means to control the operation of said motor, said control means being mounted on said handle means and including a switch, wherein the operator can manipulate said switch to select between the first and second modes of operation, said first mode of operation being a self-propelled mode wherein the drive shaft and motor are coupled to and rotatably drive the driven wheel and the handle is adapted to guide the suitcase along its intended path, and said second mode of operation being a manual mode wherein the drive shaft and motor are uncoupled from the driven wheel and the handle is adapted to allow an operator to simultaneously manually propel and guide the suitcase.

2. A portable suitcase as recited in claim 1, wherein said battery means is a removable and rechargeable battery, said battery means being snap fit into said outer shell of said suitcase.

3. A portable suitcase as in claim 1, wherein said driven wheel is one of a pair of rear wheels, each of said rear wheels being outwardly spaced from sidewalls of said suitcase to stably support said suitcase during movement thereof.

4. A portable suitcase as recited in claim 3, wherein said battery means is a removable and rechargeable battery, said battery means being snap fit into said suitcase.

5. A portable suitcase for transporting articles, comprising:
    a motor means including a drive shaft, said drive shaft being coupled to a centrifugal clutch associated with a driven wheel, said centrifugal clutch mechanically coupling said driven wheel to said drive shaft when said motor is in a first mode of operation and uncoupling said driven wheel from said drive shaft when said motor is in said a second mode of operation, said centrifugal clutch including a clutch housing fastened to said driven wheel, a clutch drive wheel mounted on said drive shaft, and a clutch brake, said clutch brake being pivotally mounted on said clutch drive wheel whereby rotation of said drive shaft and said clutch drive wheel causes said clutch brake to pivot and engage said clutch housing, engagement of said clutch brake and said clutch housing mechanically interlocking said clutch housing and said clutch drive wheel and causing said clutch housing and said driven wheel to rotate with said clutch drive wheel and said drive shaft;
    a control means to control the operation of said motor, said control means including a switch, wherein the operator can manipulate the switch to select between the first and second modes of operation, said first mode of operation being a self-propelled mode wherein the drive shaft and motor are coupled to and rotatably drive the driven wheel and the handle is adapted to guide the suitcase along its intended path, and said second mode of operation being a manual mode wherein the drive shaft and motor are uncoupled from the driven wheel and the handle is adapted to allow an operator to simultaneously manually propel and guide the suitcase, said driven wheel freely rotating without additional resistance from the motor in the manual mode.

6. A portable suitcase as in claim 5, wherein said driven wheel is one of a pair of rear wheels, said rear wheels being outwardly displaced from sidewalls of the suitcase to stably support said suitcase during movement thereof.

7. A portable suitcase for transporting articles, comprising:
    a motor means including a drive shaft and a centrifugal clutch, said drive shaft being coupled by said centrifugal clutch to a driven wheel when the motor is in a first mode of operation and being uncoupled from said driven wheel when the motor is in a second mode of operation, said driven wheel being one of a pair of rear wheels, said rear wheels being outwardly displaced from a plane defined by a sidewall of the suitcase to stably support said suitcase during movement thereof, said centrifugal clutch including a clutch housing fastened to said driven wheel, a clutch drive wheel mounted on said drive shaft, and a clutch brake, said clutch brake being pivotally mounted on said clutch drive wheel whereby rotation of said drive shaft and said clutch drive wheel causes said clutch brake to pivot and engage said clutch housing, engagement of said clutch brake and said clutch housing mechanically interlocking said clutch housing and said clutch drive wheel and causing said clutch housing and said driven wheel to rotate with said clutch drive wheel and said drive shaft;
    a control means to control the operation of said motor, said control means including a switch, wherein the operator can manipulate the switch to select between the first and second modes of operation, said first mode of operation being a self-propelled mode wherein the drive shaft and motor are coupled to and rotatably drive the driven wheel and the handle is adapted to guide the suitcase along its intended path, and said second mode of operation being a manual mode wherein the drive shaft and motor are uncoupled from the driven wheel and the handle is adapted to allow an operator to simultaneously manually propel and guide the suitcase, said driven wheel freely rotating without additional resistance from the motor in the manual mode.

8. A portable suitcase as recited in claim 7, further comprising a battery means, said battery means being a removable and reachargeable battery which is snap fit into said suitcase and said control means being mounted on a handle, said handle being slidably and pivotally mounted to said suitcase whereby said handle can move from a retracted, undeployed position to an extended, deployed position, said handle allowing pulling and guiding of the suitcase during operation thereof.

* * * * *

UNITED STATES PATENT AND TRADEMARK OFFICE
CERTIFICATE OF CORRECTION

PATENT NO. : 5,316,096
DATED : May 31, 1994
INVENTOR(S) : Sidney R. Good

It is certified that error appears in the above-indentified patent and that said Letters Patent is hereby corrected as shown below:

Column 6, line 7, please delete the second occurrence of "said".

Signed and Sealed this

Seventeenth Day of January, 1995

Attest:

BRUCE LEHMAN

Attesting Officer    Commissioner of Patents and Trademarks